US010493864B2

(12) United States Patent
Frye et al.

(10) Patent No.: US 10,493,864 B2
(45) Date of Patent: Dec. 3, 2019

(54) ADJUSTMENT SYSTEM FOR VEHICLE SEAT (71) Applicant: Faurecia Automotive Seating, LLC, Auburn Hills, MI (US)

(72) Inventors: Dale J. Frye, West Olive, MI (US); Jeffery T. Bonk, Chesterfield, MI (US); Matthew Shinew, Grand Rapids, MI (US); Todd Zeilinger, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 81 days.

(21) Appl. No.: 15/375,687

(22) Filed: Dec. 12, 2016

(65) Prior Publication Data

US 2017/0166087 A1 Jun. 15, 2017

Related U.S. Application Data (60) Provisional application No. 62/266,910, filed on Dec. 14, 2015.

(51) Int. Cl.
*B60N 2/02* (2006.01)
*B60N 2/22* (2006.01)
*B60N 2/16* (2006.01)
*B60N 2/06* (2006.01)
*B60N 2/12* (2006.01)
*B60N 2/18* (2006.01)

(52) U.S. Cl.
CPC ......... *B60N 2/0228* (2013.01); *B60N 2/0232* (2013.01); *B60N 2/06* (2013.01); *B60N 2/12* (2013.01); *B60N 2/16* (2013.01); *B60N 2/18* (2013.01); *B60N 2/22* (2013.01)

(58) Field of Classification Search
USPC .................................................. 248/429, 430
See application file for complete search history.

(56) References Cited

U.S. PATENT DOCUMENTS

| 4,922,170 | A | * | 5/1990 | Kawasaki | ............ | B60N 2/0232 |
| | | | | | | 318/434 |
| 6,401,021 | B1 | | 6/2002 | Scally | | |
| 6,460,934 | B1 | | 10/2002 | Langer | | |
| 6,509,747 | B2 | | 1/2003 | Nagai | | |
| 7,390,982 | B2 | | 6/2008 | Schmidt | | |
| 7,461,896 | B2 | | 12/2008 | Welles | | |
| 7,575,085 | B2 | | 8/2009 | Kamizono | | |
| 8,960,757 | B2 | | 2/2015 | Otake | | |
| 9,283,869 | B2 | | 3/2016 | Yamamoto | | |
| 9,758,060 | B2 | * | 9/2017 | Kubota | ................ | B60N 2/0244 |
| 9,908,440 | B2 | | 3/2018 | Sugioka | | |
| 2003/0090133 | A1 | | 5/2003 | Nathan | | |
| 2006/0217864 | A1 | | 9/2006 | Johnson | | |

(Continued)

OTHER PUBLICATIONS

2015 Honda Odyssey Owners Guide, published by Honda, copyright 2014, latest revision May 29, 2015, Cover, Table of Contents, and p. 41.*

(Continued)

*Primary Examiner* — David E Allred
(74) *Attorney, Agent, or Firm* — Barnes & Thornburg LLP (57) ABSTRACT

A vehicle seat includes a seat bottom coupled to a floor to move relative to the floor and a seat back coupled to the seat bottom to move relative to the seat bottom.

12 Claims, 10 Drawing Sheets (56) References Cited

U.S. PATENT DOCUMENTS

| | | |
|---|---|---|
| 2007/0063567 A1 | 3/2007 | Nakaya |
| 2007/0091627 A1* | 4/2007 | Nitawaki .............. B60R 25/246 |
| | | 362/501 |
| 2008/0256967 A1* | 10/2008 | Errington ........... B60H 1/00742 |
| | | 62/244 |
| 2010/0331144 A1* | 12/2010 | Rindfleisch ...... A63B 21/00178 |
| | | 482/6 |
| 2011/0275255 A1* | 11/2011 | Au ........................... B60F 3/00 |
| | | 440/12.5 |
| 2011/0316318 A1 | 12/2011 | Yamaguchi |
| 2013/0154319 A1 | 6/2013 | Nouvel |
| 2014/0084656 A1 | 3/2014 | Hozumi |
| 2014/0265477 A1 | 9/2014 | Yetukuri |
| 2015/0108818 A1 | 4/2015 | Yamamoto |
| 2017/0101032 A1 | 4/2017 | Sugioka |

OTHER PUBLICATIONS

U.S. Office Action for U.S. Appl. No. 15/079,581 dated Aug. 3, 2017, 3821 US II, 14 pages.

Office Action dated Feb. 1, 2018 for U.S. Appl. No. 15/079,581; (pp. 1-6).

Chinese Office Action for Chinese App. No. 201510665417.4 dated Sep. 19, 2018, 3683 CN II, 8 pages.

Office Action dated Jan. 31, 2019 for U.S. Appl. No. 15/375,702, 3996 US-U II, (pp. 1-6).

* cited by examiner

ADJUSTMENT SYSTEM FOR VEHICLE SEAT

PRIORITY CLAIM

This application claims priority under 35 U.S.C. § 119(e) to U.S. Provisional Application Ser. No. 62/266,910, filed Dec. 14, 2015, which is expressly incorporated by reference herein.

BACKGROUND

The present disclosure relates to an occupant support, and particularly to an occupant support embodied as a vehicle seat. More particularly, the present disclosure relates to a vehicle seat movable relative to a floor of a vehicle.

SUMMARY

According to the present disclosure, a vehicle seat is configured to support an occupant of the vehicle above a floor of the vehicle. The vehicle seat includes a seat bottom coupled to the floor of the vehicle and a seat back coupled to the seat bottom to move relative to the seat bottom.

In illustrative embodiments, an occupant-support system includes the vehicle seat and a seat-motion system. The seat-motion system is configured to sense input from an occupant and move the vehicle seat based on the input from the occupant. The seat-motion system includes a seat-movement unit, a seat-input unit, and a controller that commands the seat-movement unit to move the seat back, seat bottom, or both in response to input provided by the occupant and sensed by the seat-input unit.

In illustrative embodiments, the seat-input unit includes a handle including a first mount end connected to a first sensor and a second mount end connected to a second sensor. Each of the first sensor and the second sensor sense force applied by the occupant to the handle and send signals to the controller. The controller interprets the sensed signal and signals the seat-movement unit to move the vehicle seat accordingly. In some embodiments, the first sensor and the second sensor cooperate to sense forward forces, rearward forces, upward forces, and torque.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 21:
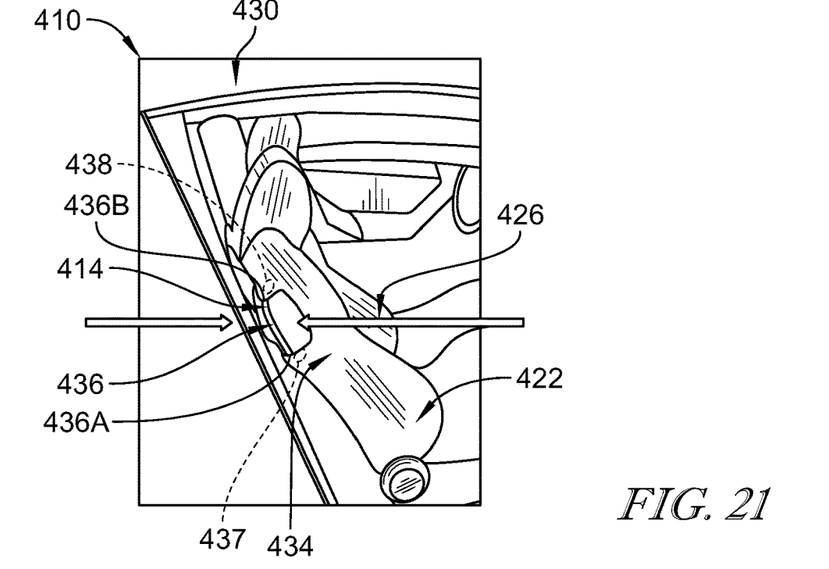
FIG. 21 is a diagrammatic view of a fourth embodiment of an occupant-support system in accordance with the present disclosure showing that the occupant-support system includes a vehicle seat configured to move relative to a floor of a vehicle and a seat-motion system including a seat-input unit configured to receive user inputs via a deformable handle coupled to a seat back of the vehicle seat, a seat-movement unit configured to move the vehicle seat, and a controller configured to receive the user inputs and issue commands to the seat-movement unit to move the vehicle seat.
Figure 22:
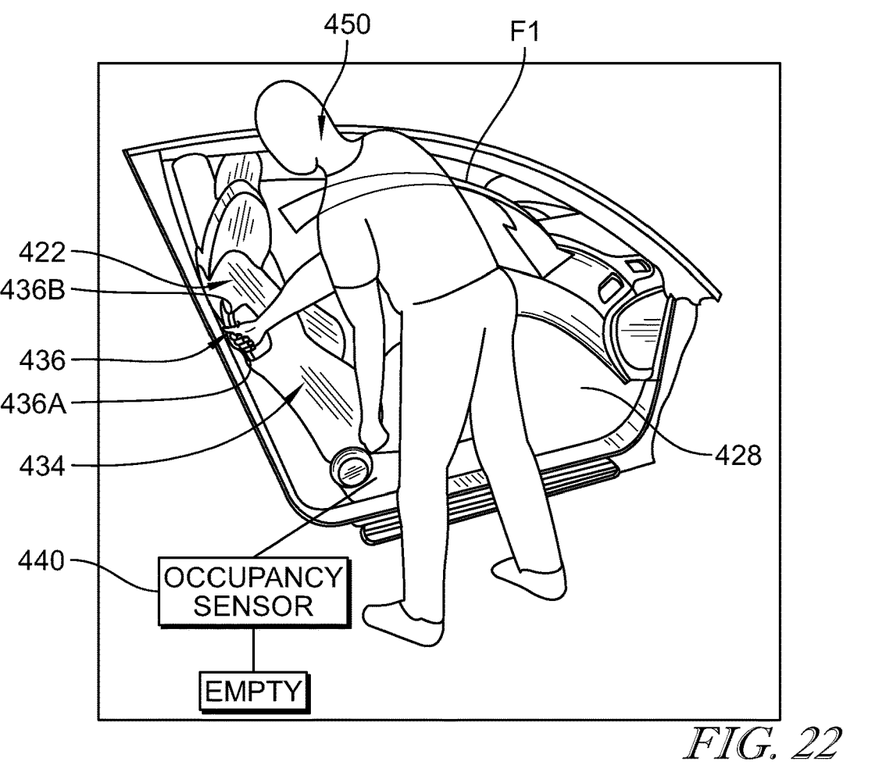
FIG. 22 is a perspective view showing an occupant using engaging the handle the occupant-support system of FIG. 21 to move the vehicle seat from the use position to the rear-seating access arrangement as a result of an occupancy sensor included in the seat-input unit detecting that the vehicle seat is empty.
Figure 23:
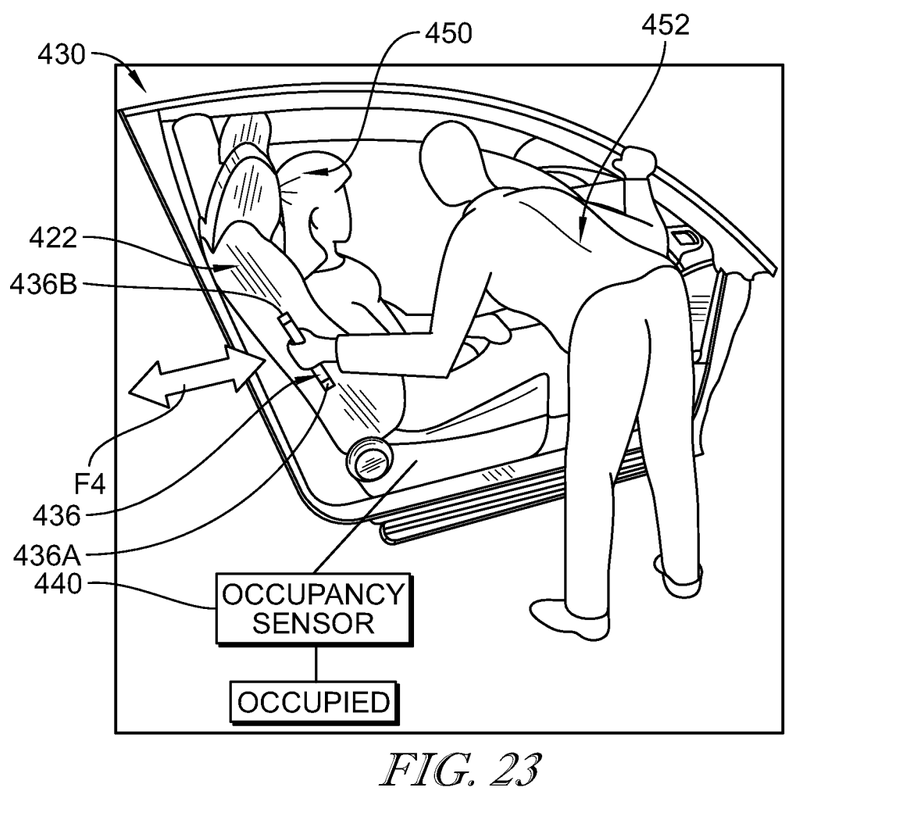
FIG. 23 is a view similar to FIG. 22 showing an occupant sitting in the vehicle seat and a user engaging the handle of the occupant-support system to cause the vehicle seat to translate back and forth as a result of the occupancy sensor detecting that the vehicle seat is occupied.

A first embodiment of an occupant-support system 10 in accordance with the present disclosure is shown in FIGS. 1-9. The occupant-support system 10 includes a seat-motion system 12 that is configured to sense occupant input and move the vehicle seat based on the occupant 50 input. The occupant-support system 10 senses occupant 50 input using a seat-input unit 14 that includes a handle 16 and the first and second sensors 18, 20 that are configured to sense force applied to the handle 16 by the occupant 50. A controller 32 included in the seat-motion system 12 receives signals from the sensors 18 and 20 and converts the sensor information into commands to move the vehicle seat 22 as desired by the occupant 50. A second embodiment of an occupant-support system 210 in accordance with the present disclosure is shown in FIGS. 10-14. A third embodiment of an occupant-support system 310 in accordance with the present disclosure is shown in FIGS. 15-20. A fourth embodiment of an occupant-support system 410 is shown in FIGS. 21-23.

Figure 1:
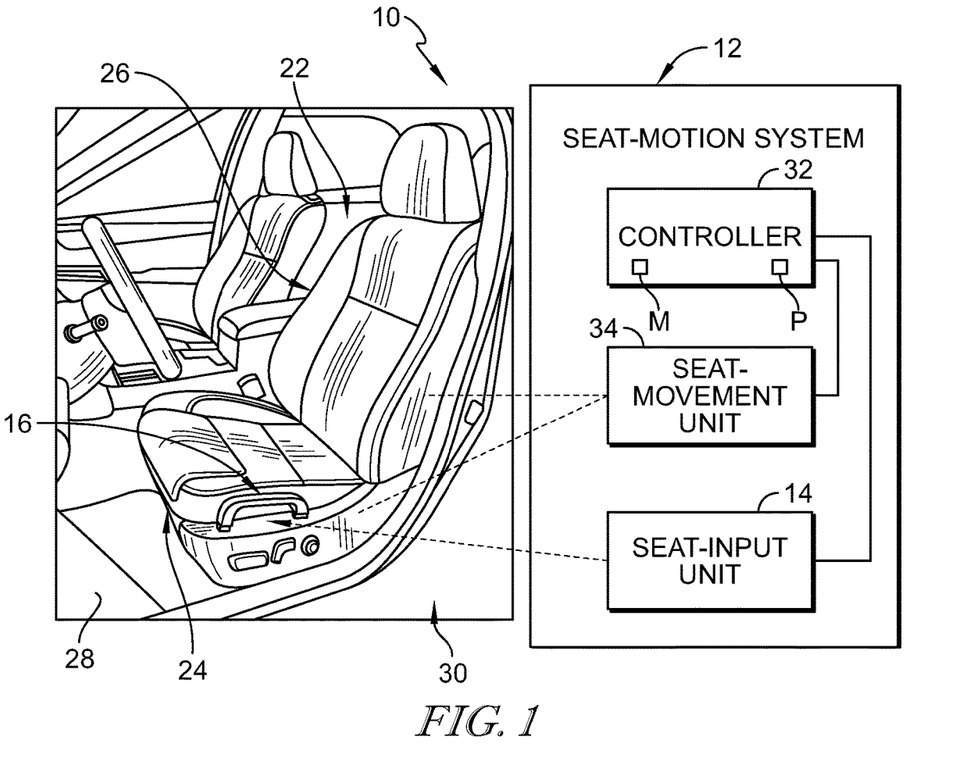
FIG. 1 is a diagrammatic view of an occupant-support system in accordance with the present disclosure showing that the occupant-support system includes a vehicle seat configured to move relative to a floor of a vehicle and a seat-motion system including a seat-input unit configured to receive user inputs via a rigid handle, a seat-movement unit configured to change an arrangement of the vehicle seat, and a controller configured to receive the user inputs and issue commands to the seat-movement unit to move the vehicle seat.

The occupant-support system 10 includes a vehicle seat 22 and the seat-motion system 12 as shown in FIG. 1. The vehicle seat 22 includes a seat bottom 24 and a seat back 26 as shown in FIG. 1. The seat bottom 24 is coupled to a floor 28 of a vehicle 30 to move relative to the floor 28. The seat back 26 is coupled to the seat bottom 24 to move relative to the seat bottom 24. The seat-motion system 12 is coupled to the vehicle seat 22 and configured to sense input from an occupant 50, interpret the sensed input, and move the vehicle seat 22 to the desired position.

The seat-motion system 12 includes the controller 32, a seat-movement unit 34, and the seat-input unit 14 as shown in FIG. 1. The seat-input unit 14 is configured to be engaged by an occupant 50, sense input from the occupant 50, and send sensor signals indicative of the input to the controller 32. The controller 32 receives the sensor signals, interprets the signals, and sends commands to the seat-movement unit 34. The seat-movement unit 34 receives the commands and causes the vehicle seat 22 to move.

Figure 2:
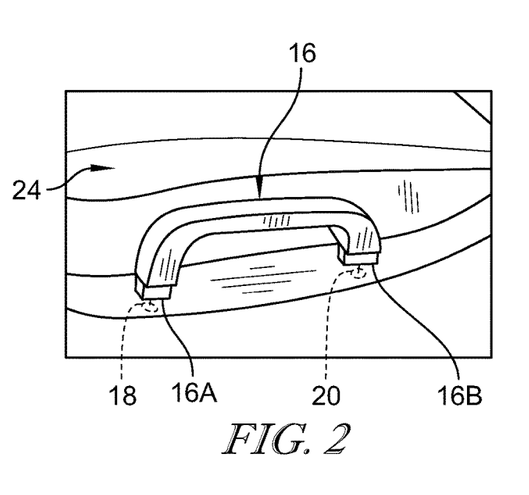
FIG. 2 is an enlarged partial perspective view of a portion of FIG. 1 showing the seat-input unit including the rigid handle coupled to a seat bottom of the vehicle seat.
Figure 3:
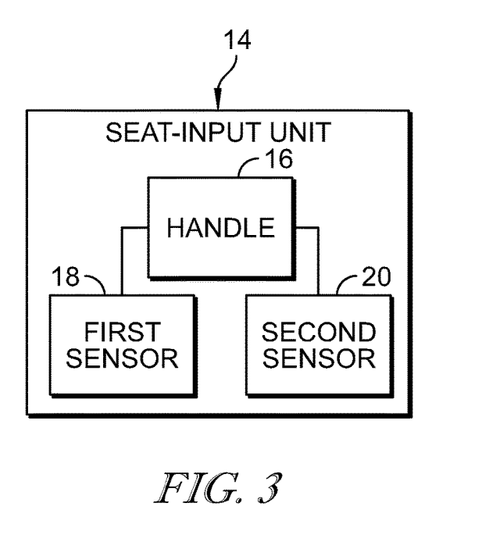
FIG. 3 is a diagrammatic view of the seat-input unit of FIGS. 1 and 2 showing that the seat-input unit includes a handle, a first sensor coupled to a first mount end of the handle, and a second sensor coupled to a second mount end of the handle.

The seat-input unit 14 includes a rigid handle 16, a first sensor 18, and a second sensor 20 as shown in FIGS. 2 and 3. In one example, the rigid handle 16 is coupled to the seat bottom 24 to move therewith and relative thereto. The first sensor 18 is arranged between a first mount end 16A of the rigid handle 16 and the seat bottom 24. The second sensor 20 is arranged between a second mount end 16B of the rigid handle 16 and the seat bottom. Together, the first and second sensors 18, 20 cooperate to sense engagement of the rigid handle 16 by the occupant 50 and convert that input into sensor signals communicated to the controller 32 as suggested in FIG. 1.

Figure 4:
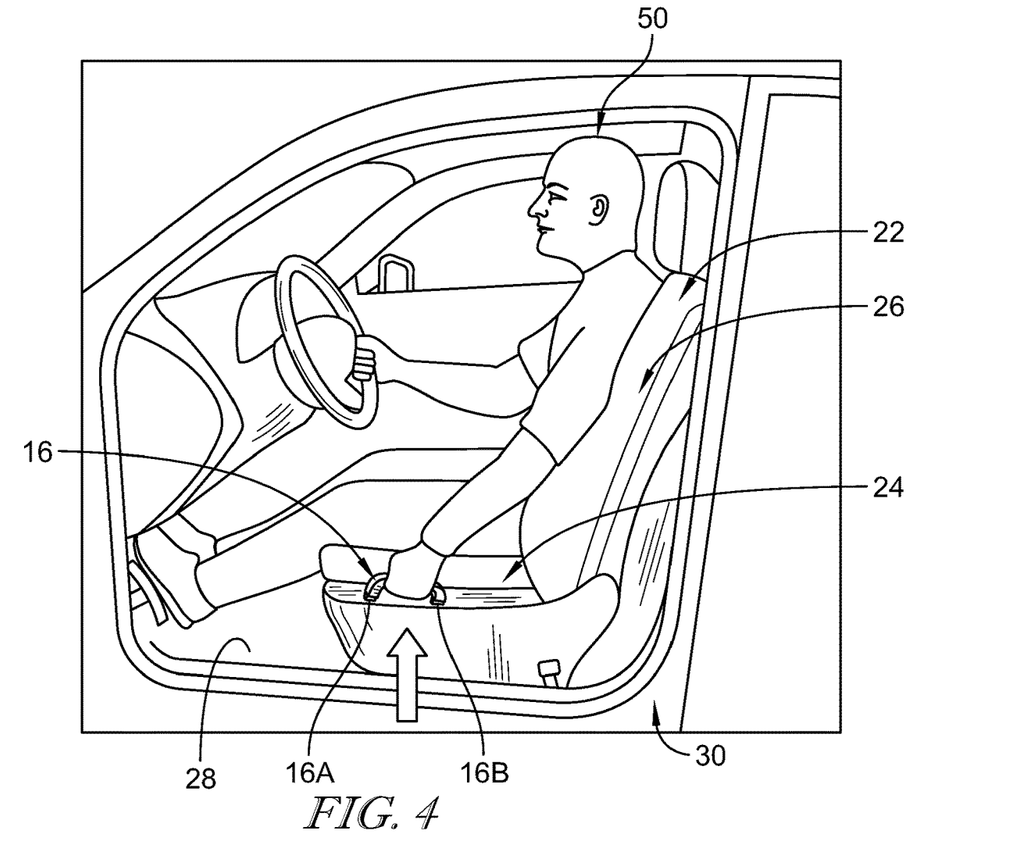
FIG. 4 is a perspective view showing one example of use where an occupant sitting on the vehicle seat grasps the handle and applies an upward force to the handle to cause the vehicle seat to raise upward relative to the floor of the vehicle.
Figure 5:
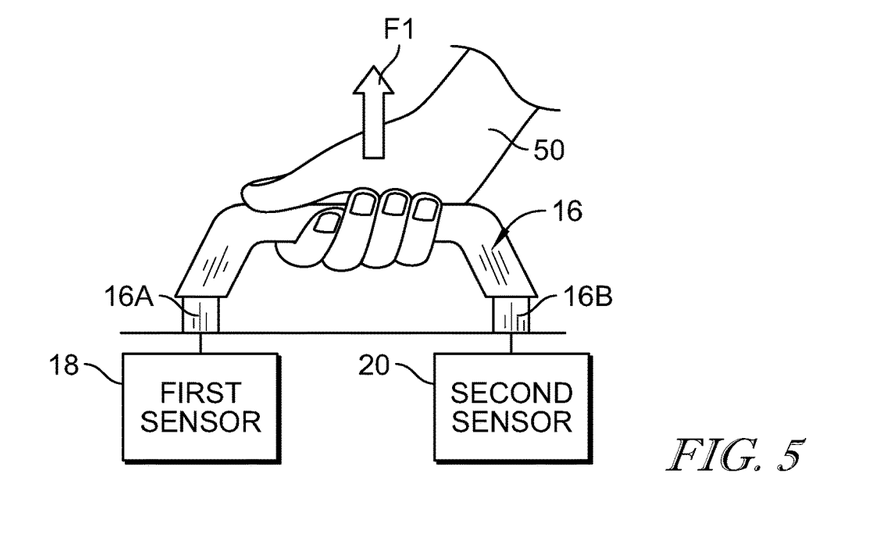
FIG. 5 is a diagrammatic view showing the occupant applying the upward force to the handle suggesting that the first and second sensors are coupled to the handle to sense the upward force.

In one example of use, an occupant 50 sitting on the vehicle seat 22 reaches down and grabs the rigid handle 16 as shown in FIGS. 4 and 5. The occupant 50 desires to raise the seat bottom 24 relative to the floor 28 of the vehicle 30 and pulls up on the rigid handle 16 applying an upward force F1 to the rigid handle 16 as shown in FIGS. 4 and 5. The upward force F1 is transferred through the rigid handle 16 to the first and second sensors 18, 20. As a result, the first and second sensors 18, 20 both sense an upward force or a tensile force applied to each. Both sensors 18, 20 send a sensor signal to the controller 32 indicating the upward force F1 or tensile force has been applied to the rigid handle 16.

The controller 32 receives both sensor signals. Software or instructions stored on memory (M) included in controller 32 is executed by a processor (P) included in the controller 32 using the sensor signals. The controller 32 determines that the occupant 50 intended to raise the seat bottom 24 because both sensor signals indicate the upward force F1 was applied to the rigid handle 16. The controller 32 then issues a command to the seat-movement unit 34 to raise the seat bottom 24 relative to the floor 28. Once the seat-movement unit 34 receives the command, the seat-movement unit 34 causes an electric motor or other suitable actuator to raise a height of the seat bottom 24.

Figure 6:
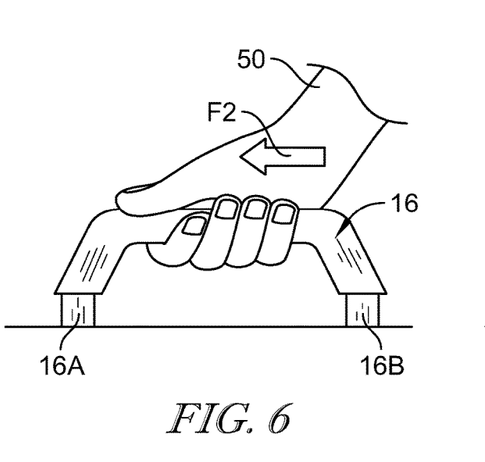
FIG. 6 is a view similar to FIG. 5 showing the occupant applying a forward force to the handle to cause the vehicle seat to translate in a forward direction toward a steering wheel of the vehicle.

In another example of use, the occupant 50 desires to translate the vehicle seat 22 in a forward direction relative to the floor 28 as suggested in FIG. 6. The occupant 50 applies a forward force F2 to the rigid handle 16. The first and second sensors 18, 20 detect the forward force F2 being transmitted through the rigid handle 16 to the sensors 18, 20. The forward force F2 may also be called a longitudinal or shear force. As a result, the first and second sensors 18, 20 both sense the forward force F2 or longitudinal force applied to each. Both sensors 18, 20 send a sensor signal to the controller 32 indicating the forward force F2 has been applied to the rigid handle 16.

The controller 32 receives both sensor signals. The controller 32 determines that the occupant 50 intended to translate the vehicle seat 22 in the forward direction because both sensor signals indicate the forward force F2 was applied to the rigid handle 16. The controller 32 then issues a command to the seat-movement unit 34 to translate or release the vehicle seat 22 for translational movement relative to the floor 28 in the forward direct. Once the seat-movement unit 34 receives the command, the seat-movement unit 34 causes an electric motor or other suitable actuator to translate the vehicle seat 22. In another example, the seat-movement unit 34 causes a lock mechanism to move from a locked position blocking movement of the seat to a freed position which allows the vehicle seat 22 to move in response to force applied from the occupant 50. Reference is hereby made to U.S. patent application Ser. No. 15/079,581 filed Mar. 24, 2016 and entitled VEHICLE SEAT for disclosure relating to movement mechanisms for moving a vehicle seat, which application is hereby incorporated in its entirety herein.

Figure 7:
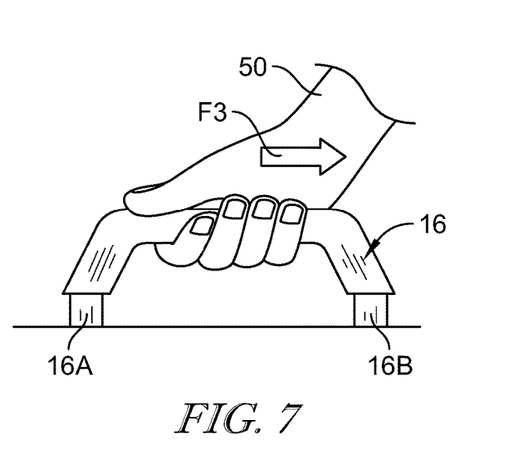
FIG. 7 is a view similar to FIG. 6 showing the occupant applying a rearward force to the handle to cause the vehicle seat to translate in a rearward direction away from the steering wheel.

In another example of use, the occupant 50 desires to translate the vehicle seat 22 in a rearward direction relative to the floor 28 as suggested in FIG. 7. The occupant 50 applies a rearward force F3 to the rigid handle 16. The first and second sensors 18, 20 detect the rearward force F3 being transmitted through the rigid handle 16 to the sensors 18, 20. The rearward force F3 may also be called a rear longitudinal or rear shear force. As a result, the first and second sensors 18, 20 both sense the rearward force F3 and send a sensor signal to the controller 32 indicating the rearward force F3 has been applied to the rigid handle 16.

The controller 32 receives both sensor signals. The controller 32 determines that the occupant 50 intended to translate the vehicle seat 22 in the rearward direction because both sensor signals indicate the rearward force F3 was applied to the rigid handle 16. The controller 32 then issues a command to the seat-movement unit 34 to translate or release the vehicle seat 22 for translational movement relative to the floor 28 in the rearward direct. Once the seat-movement unit 34 receives the command, the seat-movement unit 34 causes an electric motor or other suitable actuator to translate the vehicle seat 22. In another example, the seat-movement unit 34 causes a lock mechanism to move from a locked position blocking movement of the seat to a freed position which allows the vehicle seat 22 to move in response to force applied from the occupant 50.

Figure 8:
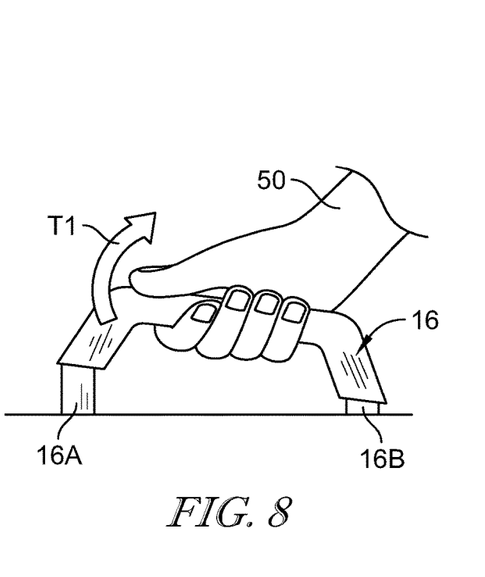
FIG. 8 is a view similar to FIG. 7 showing the occupant applying a clockwise torque to the handle to cause a forward end of the seat bottom to raise relative to the floor of the vehicle.

In another example of use, the occupant 50 desires to tilt a front end of the seat bottom 24 upwardly relative to the floor 28 as suggested in FIG. 8. The occupant 50 applies a clockwise torque T1 to the rigid handle 16. The first and second sensors 18, 20 detect the clockwise torque T1 being transmitted through the rigid handle 16 to the sensors 18, 20. As a result, the first and second sensors 18, 20 both sense the clockwise rotational torque T1 and send a sensor signal to the controller 32 indicating the clockwise rotational torque T1 has been applied to the rigid handle 16. First sensor 18 may sense an upward or tensile force while second sensor 20 may sense a downward or compressive force. Together, this combination of forces may be interpreted as the clockwise rotational torque T1.

The controller 32 receives both sensor signals. The controller 32 determines that the occupant 50 intended to tilt upwardly the front portion of the vehicle seat 22 because both the first sensor 18 senses an upward force and the second sensor 20 senses a downward force, or in combination, the clockwise rotational torque T1 applied to the rigid handle 16. The controller 32 then issues a command to the seat-movement unit 34 to tilt upwardly the front portion of the vehicle seat 22 relative to the floor 28.

Figure 9:
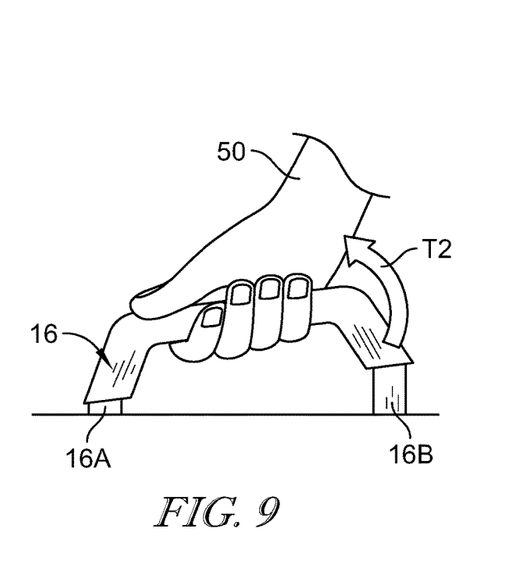
FIG. 9 is a view similar to FIG. 8 showing the occupant applying a counter-clockwise torque to the handle to cause a rearward end of the seat bottom to raise relative to the floor of the vehicle.

In another example of use, the occupant 50 desires to tilt a rear end of the seat bottom 24 upwardly relative to the floor 28 as suggested in FIG. 9. The occupant 50 applies a counter-clockwise torque T2 to the rigid handle 16. The first and second sensors 18, 20 detect the counter-clockwise torque T2 being transmitted through the rigid handle 16 to the sensors 18, 20. As a result, the first and second sensors 18, 20 both sense the counter-clockwise torque T2 and send a sensor signal to the controller 32 indicating the counter-clockwise torque T2 has been applied to the rigid handle 16. First sensor 18 may sense a downward or compressive force while second sensor 20 may sense an upward or tensile force. Together, this combination of forces may be interpreted as the counter-clockwise torque T2 by the controller 32.

The controller 32 receives both sensor signals. The controller 32 determines that the occupant 50 intended to tilt upwardly the rear portion of the vehicle seat 22 because both the first sensor 18 senses the downward force and the second sensor 20 senses the upward force, or in combination, the counter-clockwise torque T2 applied to the rigid handle 16. The controller 32 may also interpret this combination of commands as the occupant 50 desiring to raise the rear end of the seat and lower the front end of the seat.

In one example, sensors 18, 20 may be flex sensors, strain gauges, load cells, piezo sensors, linear or rotary potentiometers, pressure sensitive pads, gyro detectors, combinations thereof, or any other suitable sensor. In another example, the handle 16 moves relative to the seat bottom 24. In this example, the sensors 18, 20 may be accelerometers coupled to the handle 16 to move therewith. Reference is hereby made to U.S. patent application Ser. No. 14/878,306 filed Oct. 8, 2015 and entitled SEAT POSITION SENSING AND ADJUSTMENT for disclosure relating to accelerometers used with vehicle seats, which application is hereby incorporated in its entirety herein.

Figure 10:
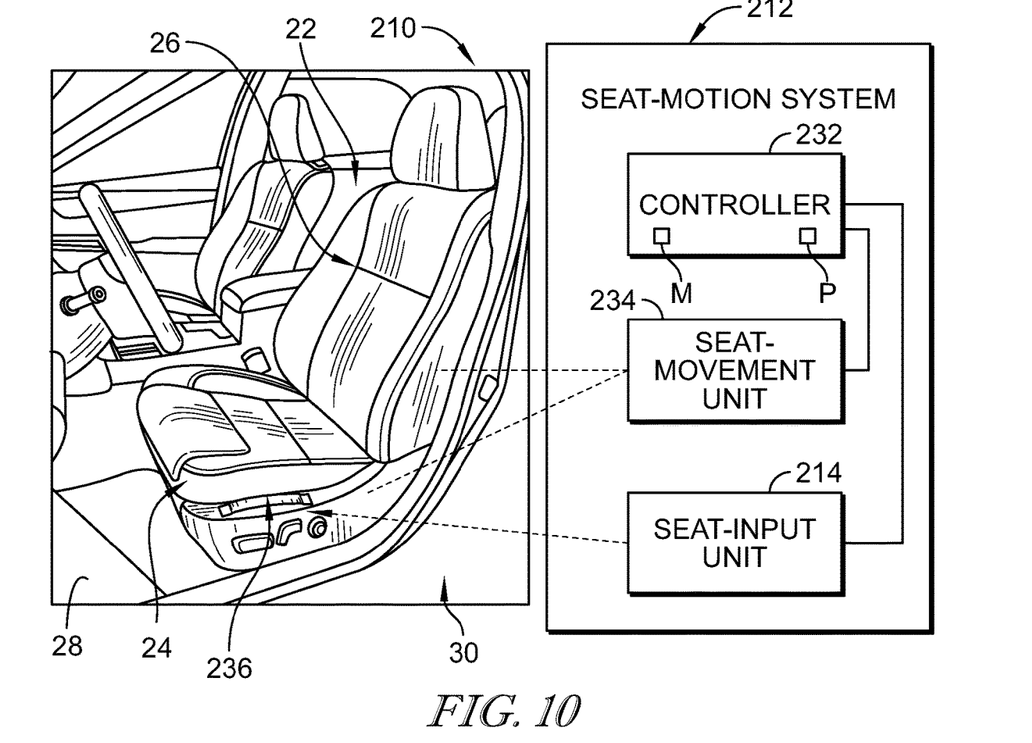
FIG. 10 is a diagrammatic view of a second embodiment of an occupant-support system in accordance with the present disclosure showing that the occupant-support system includes a vehicle seat configured to move relative to a floor of a vehicle and a seat-motion system including a seat-input unit configured to receive user inputs via a deformable handle, a seat-movement unit configured to change an arrangement of the vehicle seat, and a controller configured to receive the user inputs and issue commands to the seat-movement unit to move the vehicle seat.

The occupant-support system 210 includes a vehicle seat 22 and the seat-motion system 212 as shown in FIG. 10. The seat-motion system 212 is coupled to the vehicle seat 22 and configured to sense input from an occupant 50, interpret the sensed input, and move the vehicle seat 22 to the desired position.

The seat-motion system 212 includes a controller 232, a seat-movement unit 234, and the seat-input unit 214 as shown in FIG. 10. The seat-input unit 214 is configured to be engaged by an occupant 50, sense input from the occupant 50, and send sensor signals indicative of the input to the controller 232. The controller 232 receives the sensor signals, interprets the signals, and sends commands to the seat-movement unit 234. The seat-movement unit 234 receives the commands and causes the vehicle seat 22 to move.

Figure 11:
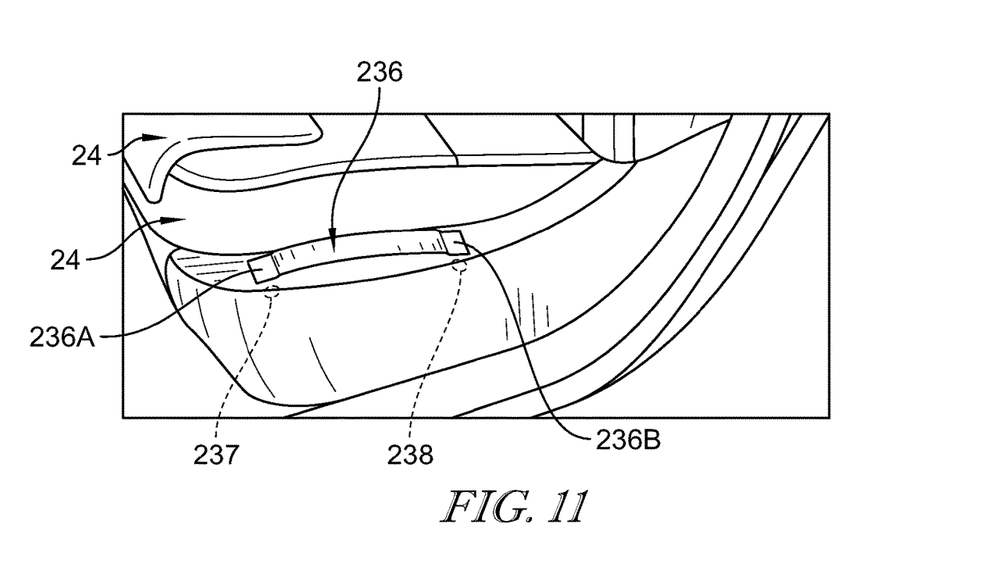
FIG. 11 is an enlarged partial perspective view of a portion of FIG. 10 showing the seat-input unit including the deformable handle coupled to a seat bottom of the vehicle seat.

The seat-input unit 214 includes a deformable handle 236 (also called a flexible strap 236), a first sensor 237, and a second sensor 238 as shown in FIG. 11. In one example, the deformable handle 236 is coupled to the seat bottom 24 to move therewith and relative thereto. The first sensor 237 is arranged between a first mount end 236A of the rigid handle 236 and the seat bottom 24. The second sensor 238 is arranged between a second mount end 236B of the rigid handle 236 and the seat bottom 24. Together, the first and second sensors 237, 238 cooperate to sense engagement of the deformable handle 236 by the occupant 50 and convert that input into sensor signals communicated to the controller 232 as suggested in FIGS. 12-14.

Figure 12:
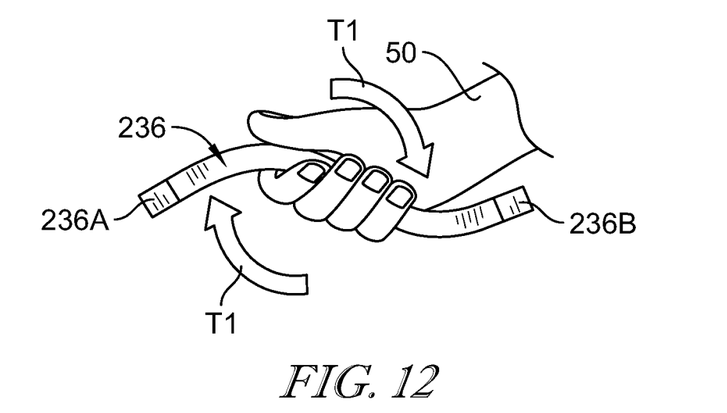
FIG. 12 is a diagrammatic view showing the occupant applying a clockwise torque to the deformable handle to cause a forward portion of the seat bottom to raise relative to the floor and a rearward portion of the seat bottom to lower relative to the floor.
Figure 13:
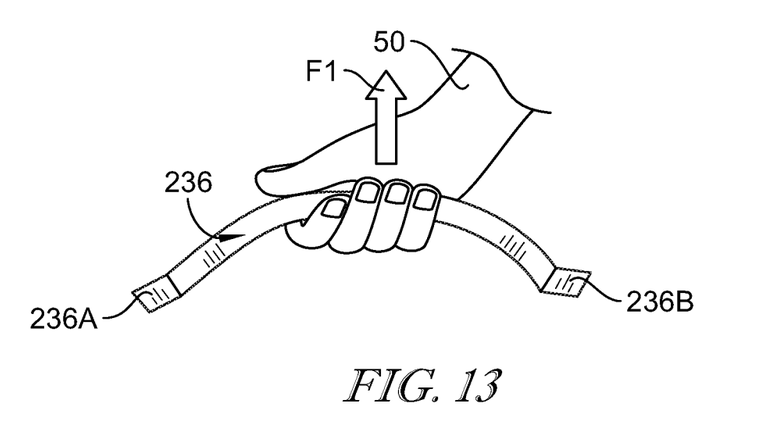
FIG. 13 is a view similar to FIG. 12 showing the occupant applying an upward force to the deformable handle to cause the seat bottom to raise relative to the floor.
Figure 14:
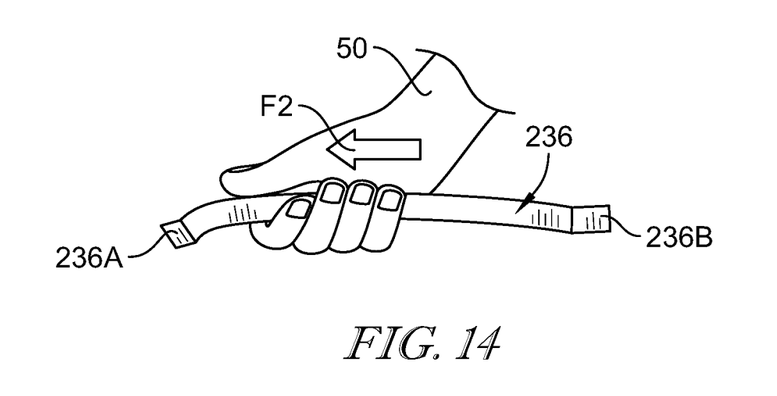
FIG. 14 is a view similar to FIG. 13 showing the occupant applying a forward force to the deformable handle to cause the vehicle seat to translate in a forward direction toward the steering wheel.

In one example of use, the occupant 50 sitting on the vehicle seat 22 reaches down and grabs the deformable handle 236 as suggested in FIGS. 12-14. The occupant 50 desires to tilt upwardly the front portion of the seat bottom 24 relative to the floor while lowering the rear portion of the seat bottom 24. To do this, the occupant 50 applies a clockwise torque T1 to the deformable handle 236 as shown in FIG. 12. The clockwise torque T1 is transferred through the deformable handle 236 to the first and second sensors 237, 238. As a result, the first sensor 237 senses an upward force, a rearward force, or a combination thereof and the second sensor 238 senses a downward force, a forward force, or a combination thereof. Both sensors 18, 20 send a sensor signal to the controller 232 indicating the clockwise torque T1 has been applied to the deformable handle 236.

The controller 232 receives both sensor signals. Software or instructions stored on memory (M) included in controller 232 is executed by a processor (P) included in controller 232 using the sensor signals. The controller 232 determines that the occupant 50 intended to raise the front portion of the seat bottom 24 while lower the rear portion of the seat bottom 24 because of the combination of forces imparted on the deformable handle 236 when the occupant 50 applies the clockwise torque T1 to the deformable handle 236. The controller 232 then issues a command to the seat-movement unit 234 to raise the front portion of the seat bottom 24 while lowering the rear portion of the seat bottom 24. Once the seat-movement unit 234 receives the command, the seat-movement unit 234 causes an electric motor or other suitable actuator to move the vehicle seat 22 as commanded.

In another example of use, the occupant 50 desires to raise the seat bottom 24 relative to the floor 28 as suggested in FIG. 13. The occupant 50 applies an upward force F1 to the deformable handle 236. The first and second sensors 237, 238 detect the upward force F1 being transmitted through the deformable handle 236 to the sensors 237, 238. As a result, the first and second sensors 237, 238 both sense the upward force F1 applied to each. Both sensors 237, 238 send a sensor signal to the controller 232 indicating the upward force F1 has been applied to the deformable handle 236.

The controller 232 receives both sensor signals. The controller 232 determines that the occupant 50 intended to raise the vehicle seat 22 in the upward direction because both sensor signals indicate the upward force F1 was applied to the deformable handle 236. The controller 232 then issues a command to the seat-movement unit 234 to raise the vehicle seat 22 relative to the floor 28. Once the seat-movement unit 234 receives the command, the seat-movement unit 234 causes an electric motor or other suitable actuator to raise the vehicle seat 22.

In another example of use, the occupant 50 desires to translate the vehicle seat 22 in a forward direction relative to the floor 28 as suggested in FIG. 14. The occupant 50 applies a forward force F2 to the deformable handle 236. The first and second sensors 237, 238 detect the forward force F2 being transmitted through the deformable handle 236 to the sensors 237, 238. As a result, the first and second sensors 237, 238 both sense the forward force F2 applied to each. Both sensors 237, 238 send a sensor signal to the controller 232 indicating the forward force F2 has been applied to the deformable handle 236.

The controller 232 receives both sensor signals. The controller 232 determines that the occupant 50 intended to translate the vehicle seat 22 in the forward direction because both sensor signals indicate the forward force F2 was applied to the deformable handle 236. Controller 232 then issues a command to the seat-movement unit 234 to translate or release the vehicle seat 22 for translational movement relative to the floor 28 in the forward direct. Once the seat-movement unit 234 receives the command, the seat-movement unit 234 causes an electric motor or other suitable actuator to translate the vehicle seat 22. In another example, the seat-movement unit 234 causes a lock mechanism to move from a locked position blocking movement of the seat to a freed position which allows the vehicle seat 22 to move in response to force applied from the occupant 50.

In one example, sensors 237, 238 may be flex sensors, strain gauges, load cells, piezo sensors, linear or rotary potentiometers, pressure sensitive pads, gyro detectors, combinations thereof, or any other suitable sensor. In another example, the handle 236 moves relative to the seat bottom 24. In this example, the sensors 237, 238 may be accelerometers coupled to the handle 236 to move therewith.

Figure 15:
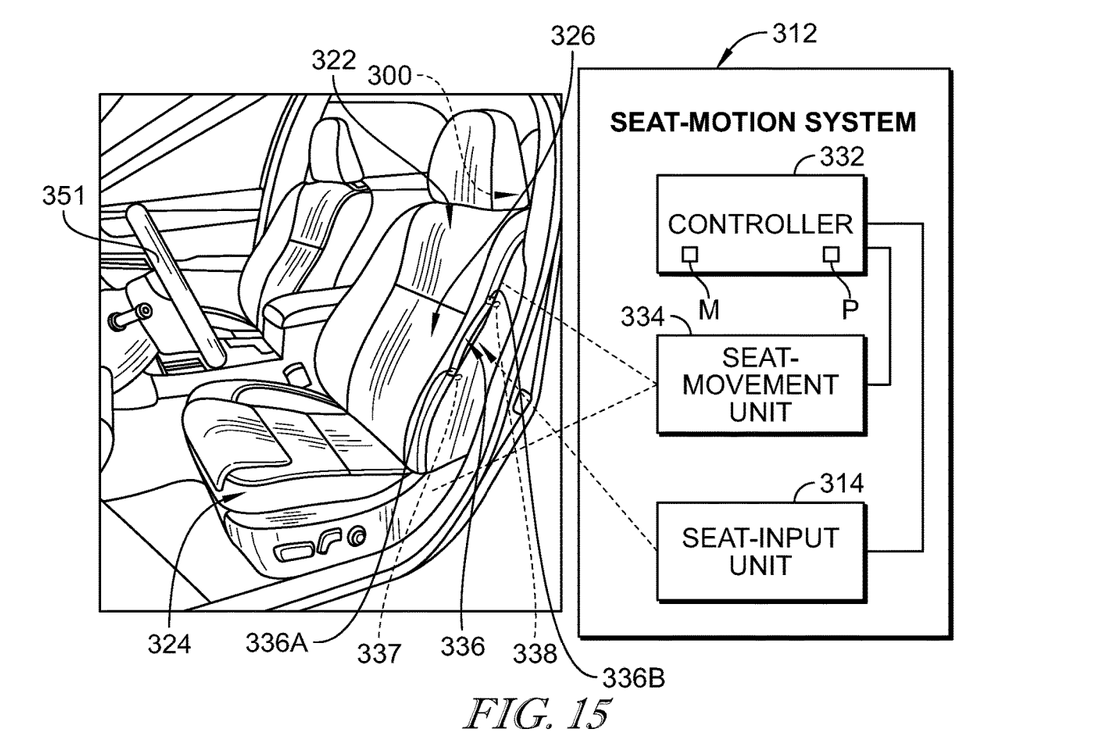
FIG. 15 is a diagrammatic view of a third embodiment of an occupant-support system in accordance with the present disclosure showing that the occupant-support system includes a vehicle seat configured to move relative to a floor of a vehicle and a seat-motion system including a seat-input unit configured to receive user inputs via a deformable handle coupled to a seat back of the vehicle seat, a seat-movement unit configured to move the vehicle seat, and a controller configured to receive the user inputs and issue commands to the seat-movement unit to move the vehicle seat.

The occupant-support system 310 includes a vehicle seat 322 and the seat-motion system 312 as shown in FIG. 15. The seat-motion system 312 is coupled to the vehicle seat 322 and configured to sense input from an occupant, interpret the sensed input, and move the vehicle seat 322 to the desired position.

The seat-motion system 312 includes a controller 332, a seat-movement unit 334, and the seat-input unit 314 as shown in FIG. 15. The seat-input unit 314 is configured to be engaged by the occupant 350, sense input from the occupant 350, and send sensor signals indicative of the input to the controller 332. The controller 332 receives the sensor signals, interprets the signals, and sends commands to the seat-movement unit 334. The seat-movement unit 334 receives the commands and causes the vehicle seat 322 to move.

The seat-input unit 314 includes a handle 336, a first sensor 337, and a second sensor 338 as shown in FIG. 15. In one example, the handle 336 is coupled to the seat back 326 to move therewith and relative thereto. The first sensor 337 is arranged between a first mount end 336A of the handle 336 and the seat back 326. The second sensor 338 is arranged between a second mount end 336B of the handle 336 and the seat back 326. Together, the first and second sensors 337, 338 cooperate to sense engagement of the handle 336 by the occupant 350 and convert that input into sensor signals communicated to the controller 332 as suggested in FIG. 15.

In one example of use, an occupant 350 sitting on a rear vehicle seat 300 grabs the handle 336 of a front vehicle seat 322 as suggested in FIGS. 16-20. The occupant 350 desires to move the front vehicle seat 322 from a use arrangement shown in FIG. 15 to a rear-seating access arrangement shown in FIGS. 18 and 19. The occupant 350 applies a forward force F1 to handle 236 as suggested in FIGS. 16 and 18 to cause the vehicle seat 322 to translate forward toward a steering wheel 301 and the seat back 326 to pivot forward toward the seat bottom 324 to assume the rear-seating access arrangement of FIGS. 18 and 19. The forward force F1 is transferred through the handle 336 to the first and second sensors 337, 338. As a result, the first sensor 337 senses the upward force F1 and the second sensor 338 senses the forward force F1. Both sensors 337, 338 send a sensor signal to the controller 332 indicating the forward force F1 has been applied to the deformable handle 336.

Figure 16:
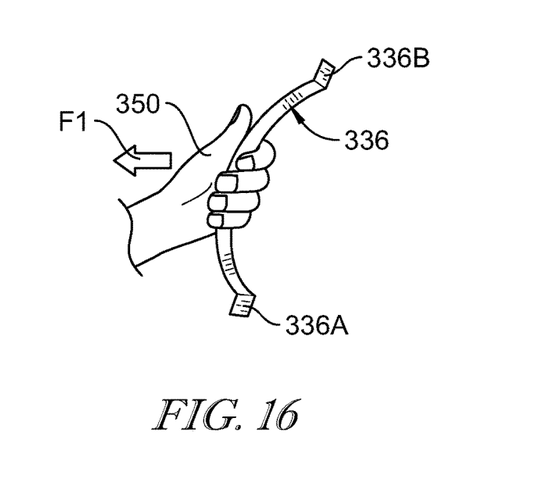
FIG. 16 is a diagrammatic view showing the occupant applying a forward force to the deformable handle to cause the vehicle seat to move from the use arrangement of FIG. 15 to a rear-seating access arrangement as suggested in FIGS. 18 and 19.

The controller 332 receives both sensor signals. Software or instructions stored on memory (M) included in controller 332 is executed by a processor (P) included in controller 332 using the sensor signals. Controller 332 determines that the occupant 350 intended move the vehicle seat 322 to the rear-seating access arrangement because of the combination of forces imparted on the handle 336 when the occupant 350 applies the forward force F1 to the handle 336. Controller 332 then issues a command to the seat-movement unit 334 to move the vehicle seat 322.

Figure 17:
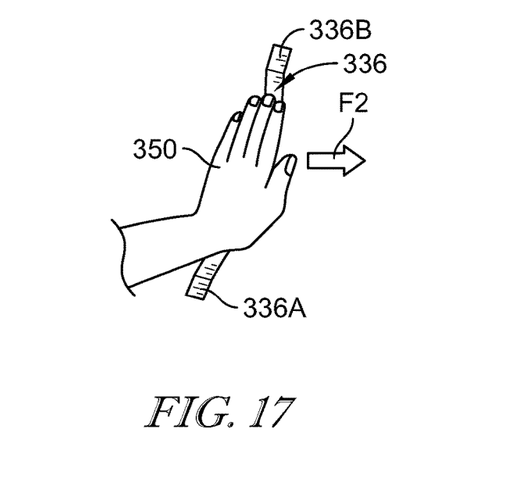
FIG. 17 is a view similar to FIG. 16 showing the occupant applying a rearward force to the deformable handle to cause the vehicle seat to move from the rear-seating access arrangement back to the use arrangement as suggested in FIG. 19.
Figure 18:
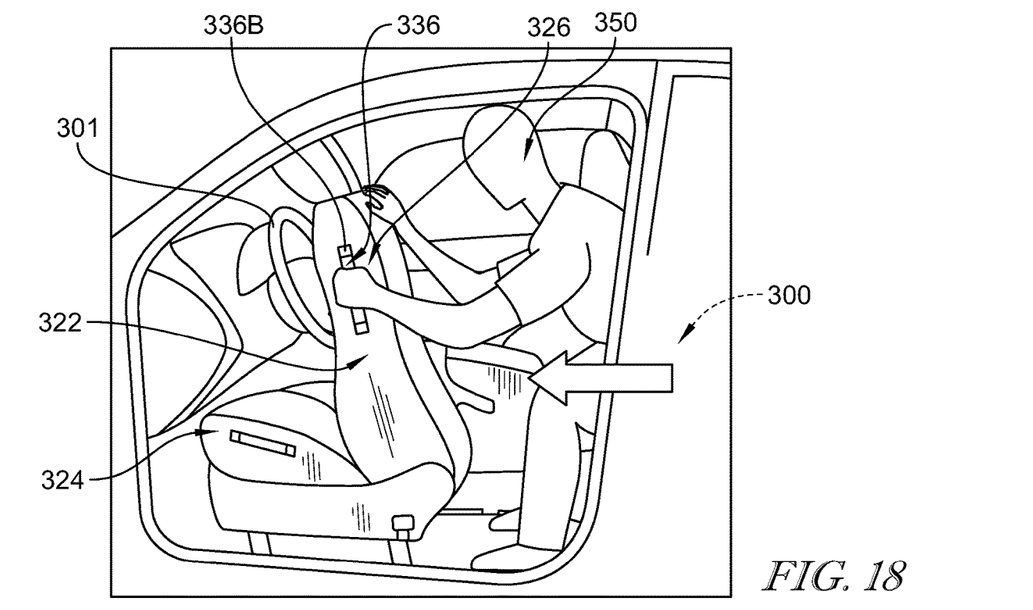
FIG. 18 is a partial perspective view showing a passenger in a rear passenger seat applying the forward force to the deformable handle on the seat back to cause the front vehicle seat to move to the rear-seating access arrangement so that the rear passenger may exit the vehicle as suggested in FIG. 19.
Figure 19:
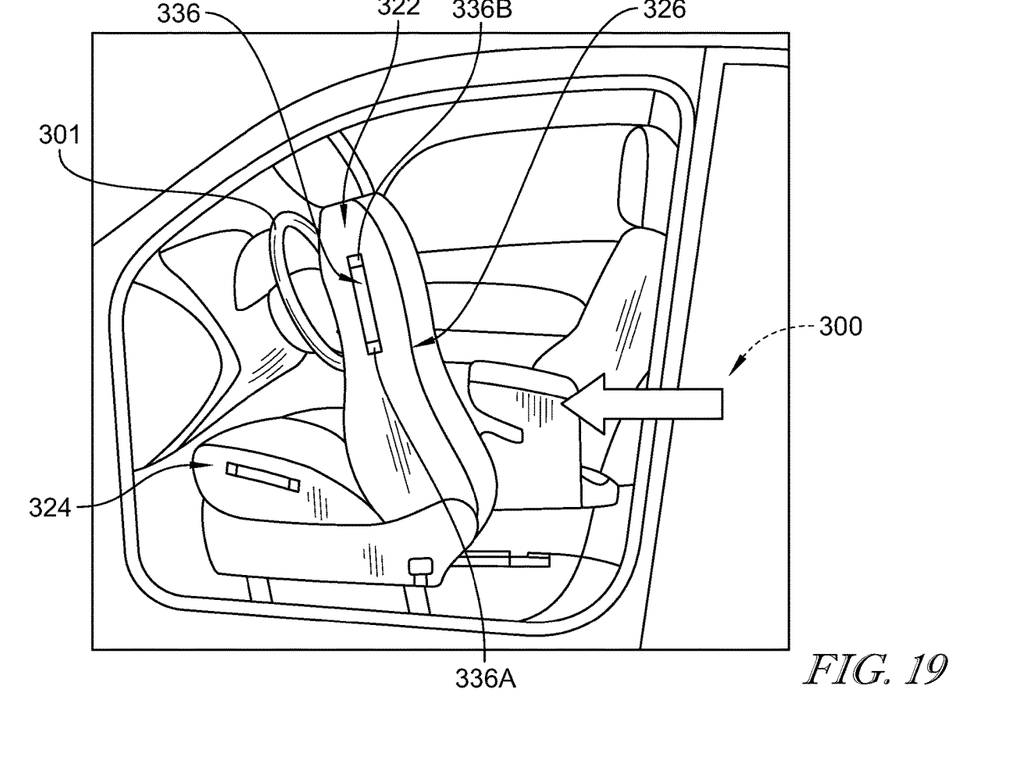
FIG. 19 is a view similar to FIG. 18 showing the front vehicle seat in the rear-seating access arrangement and the rear passenger out of the vehicle.
Figure 20:
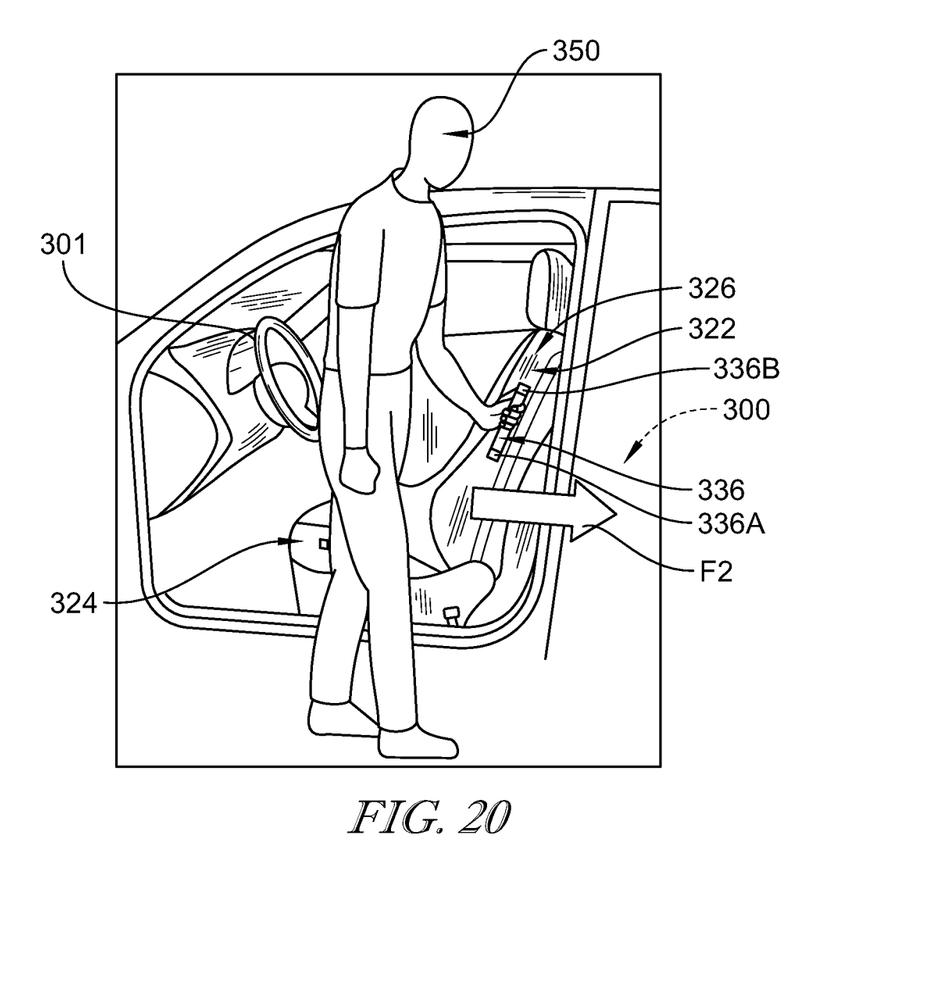
FIG. 20 is a view similar to FIG. 19 showing the rear passenger applying the rearward force to the deformable handle to cause the front vehicle seat to return to the original use arrangement.

Once the vehicle seat 322 is in the rear-seating access arrangement of FIGS. 18 and 20, the occupant 350 may return the vehicle seat 322 to the previous use arrangement by applying a rearward force F2 to the handle 336 as suggested in FIGS. 17 and 20. The occupant 350 applies the rearward force F2 to the handle 336. The first and second sensors 337, 338 detect the rearward force F2 being transmitted through the handle 336 to the sensors 337, 338. As a result, the first and second sensors 337, 338 both sense the rearward force F2 applied to each. Both sensors 337, 338 send a sensor signal to the controller 332 indicating the rearward force F3 has been applied to the handle 336.

The controller 332 receives both sensor signals. The controller 332 determines that the occupant 350 intended to return to the vehicle seat 322 to the previous use arrangement because both sensor signals indicate the rearward force F2 was applied to the handle 336. Controller 332 then issues a command to the seat-movement unit 334 to move the vehicle seat 322 back to the previous use arrangement.

In one example, sensors 337, 338 may be flex sensors, strain gauges, load cells, piezo sensors, linear or rotary potentiometers, pressure sensitive pads, gyro detectors, combinations thereof, or any other suitable sensor. In another example, the handle 336 moves relative to the seat bottom 324. In this example, the sensors 337, 338 may be accelerometers coupled to the handle 336 to move therewith.

The occupant-support system 410 includes a vehicle seat 422 and the seat-motion system 412 as shown in FIGS. 21-23. The seat-motion system 412 is coupled to the vehicle seat 422 and configured to sense input from an occupant 450, interpret the sensed input, and move the vehicle seat 422 to the desired position.

The seat-motion system includes a controller, a seat-movement unit 434, and the seat-input unit 414 as suggested in FIG. 22. The seat-input unit is configured to be engaged by an occupant 450, sense input from the occupant 450, and send sensor signals indicative of the input to the controller. The controller receives the sensor signals, interprets the signals, and sends commands to the seat-movement unit 434. The seat-movement unit 434 receives the commands and causes the vehicle seat 422 to move.

The seat-input unit 414 includes a handle 436, a first sensor 437, a second sensor 438, and an occupancy sensor 440 as shown in FIG. 22. In one example, the handle 436 is coupled to the seat back 426 to move therewith and relative thereto. The first sensor 437 is arranged between the handle 436 and the seat back 426. The second sensor 438 is arranged between the handle 436 and the seat back 426. The occupancy sensor 440 is coupled to the vehicle seat 422 and configured to detect when an occupant 450 is sitting on the vehicle seat 422 and send a sensor signal to the controller indicating the same. Together, the first and second sensors 437, 438 cooperate to sense engagement of the handle 436 by the occupant 450 and convert that input into sensor signals communicated to the controller 432. In this illustrative example, the sensors signals are interpreted to have different meanings whether the occupancy sensor 440 detects the presence of an occupant 450 on the vehicle seat 422.

In one example of use, an occupant 450 outside the vehicle 430 desires to move the vehicle seat 422 from the use arrangement of FIGS. 21 and 22 to a rear-seating access arrangement. The occupancy sensor 440 sends a signal to the controller indicating the vehicle seat 422 is empty as suggested in FIG. 22. The occupant 450 applies a forward force F1 to the handle 436 which transmits to the sensors 437, 438. The sensors 437, 438 send sensor signals indicative of the forward force F1 to the controller. The controller interprets the sensor signals from the sensors 437, 438 and the signal from the occupancy sensors 440 to indicate that the occupant 450 desires the vehicle seat 422 to assume the rear-seating access arrangement. The controller then issues commands to the seat-movement unit 434 to cause the vehicle seat 422 to assume the rear-seating access arrangement.

In another example of use, a first occupant 450 is sitting on the vehicle seat 422. A second occupant 452 is helping adjust vehicle seat 422 by moving vehicle seat 422 back and forth relative to the floor 28 of the vehicle 430. The occupancy sensor 440 sends a signal to the controller indicating the vehicle seat 422 is occupied as suggested in FIG. 23. The occupant 450 applies a force F4 to the handle 436 which transmits to the sensors 437, 438. The sensors 437, 438 send sensor signals indicative of the force F4 to the controller 432. The controller interprets the sensor signals from the sensors 437, 438 and the signal from the occupancy sensors 440 to indicate that the occupant 450 desires the vehicle seat 422 to translate back and forth relative to the floor 428 rather than assume the rear-seating access arrangement. The controller then issues commands to the seat-movement unit 434 to cause the vehicle seat 422 to translate relative to the floor.

In another example, the seat-input unit may be further configured to detect a key fob is on a passenger's side of the vehicle to cause the vehicle to automatically unlock and lighting to identify seat-adjustment controls (e.g. the handle).

The invention claimed is:

1. An occupant-support system comprising
    a vehicle seat including a seat bottom adapted to move relative to a floor of a vehicle and a seat back coupled to the seat bottom to move relative to the seat bottom and
    a seat-motion system including a seat-movement unit coupled to the vehicle seat to move the seat bottom and the seat back, a seat-input unit configured to provide sensor information in response to sensing occupant input, and a controller configured to receive sensor information from the seat-input unit and cause the seat-movement unit to move the vehicle seat based on the sensor information received,
    wherein the seat-input unit includes a handle coupled to the vehicle seat to move therewith and relative to, a first sensor arranged to extend between and interconnect a first mount end of the handle to the vehicle seat, and a second sensor arranged to extend between and interconnect a second mount end of the handle to the vehicle seat and the controller is configured to issue commands to the seat-movement unit to move the vehicle seat in response to receiving sensor information from at least one of the first and second sensors, and
    wherein the first and second sensors are each configured to send sensor information to the controller in response to sensing a force on the handle in each of a vertical direction and a horizontal direction.

2. The occupant-support system of claim 1, wherein the controller commands the seat-movement unit to raise the vehicle seat in response to both the first and second sensors sensing an upward force being applied to the handle.

3. The occupant-support system of claim 1, wherein the controller commands the seat-movement unit to move the vehicle seat in a forward direction in response to both the first and second sensors sensing a forward force being applied to the handle.

4. The occupant-support system of claim 1, wherein the controller commands the seat-movement unit to move the vehicle seat in a rearward direction in response to both the first and second sensors sensing a rearward force, opposite a forward force, being applied to the handle.

5. The occupant-support system of claim 1, wherein the controller commands the seat-movement unit to raise a forward end of the vehicle seat in response to the first sensor sensing a tension force being applied to the first mount end of the handle.

6. The occupant-support system of claim 5, wherein the controller commands the seat-movement unit to raise the forward end of the vehicle seat in response to the second sensor sensing a compression force being applied to the second mount end of the handle.

7. The occupant-support system of claim 1, wherein the controller commands the seat-movement unit to raise a rearward end of the vehicle seat in response to the second sensor sensing a counter-clockwise torque being applied to the handle.

8. The occupant-support system of claim 7, wherein the controller commands the seat-movement unit to raise the rearward end of the vehicle seat in response to the first sensor sensing a counter-clockwise torque being applied to the handle.

9. The occupant-support system of claim 8, wherein the controller commands the seat-movement unit to lower a forward end of the vehicle seat in response to the first sensor sensing a counter-clockwise torque being applied to the handle.

10. The occupant-support system of claim 1, wherein the handle is a strip of deformable material having the first mount end coupled to the vehicle seat and the second mount end coupled to the vehicle.

11. The occupant-support system of claim 1, wherein the handle is a rigid handle having a predefined shape.

12. An occupant-support system comprising
a vehicle seat including a seat bottom adapted to move relative to a floor of a vehicle and a seat back coupled to the seat bottom to move relative to the seat bottom and
a seat-motion system including a seat-movement unit coupled to the vehicle seat to move the seat bottom and the seat back, a seat-input unit configured to provide sensor information in response to sensing occupant input, and a controller configured to receive sensor information from the seat-input unit and cause the seat-movement unit to move the vehicle seat based on the sensor information received,
wherein the seat-input unit includes a handle coupled to the vehicle seat to move therewith and relative to, a first sensor arranged to extend between and interconnect a first mount end of the handle to the vehicle seat, and a second sensor arranged to extend between and interconnect a second mount end of the handle to the vehicle seat and the controller is configured to issue commands to the seat-movement unit to move the vehicle seat in response to receiving sensor information from at least one of the first and second sensors, and
wherein the first and second sensors are each configured to send sensor information to the controller in response to sensing a force on the handle in each of an upward direction, in a downward direction opposite the upward direction, in a forward direction, and in a rearward direction opposite the forward direction.

* * * * *